United States Patent
Avivi et al.

(10) Patent No.: US 10,036,895 B2
(45) Date of Patent: Jul. 31, 2018

(54) BI-DIRECTIONAL STIFFNESS FOR OPTICAL IMAGE STABILIZATION IN A DUAL-APERTURE DIGITAL CAMERA

(71) Applicant: Corephotonics Ltd., Tel-Aviv (IL)

(72) Inventors: Gal Avivi, Haifa (IL); Itay Jerby, Netanya (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 15/310,887

(22) PCT Filed: May 24, 2016

(86) PCT No.: PCT/IB2016/053026
§ 371 (c)(1),
(2) Date: Nov. 14, 2016

(87) PCT Pub. No.: WO2016/189455
PCT Pub. Date: Dec. 1, 2016

(65) Prior Publication Data
US 2018/0120583 A1      May 3, 2018

Related U.S. Application Data

(60) Provisional application No. 62/167,571, filed on May 28, 2015.

(51) Int. Cl.
*G02B 27/64* (2006.01)
*H04N 5/225* (2006.01)
*G02B 7/09* (2006.01)

(52) U.S. Cl.
CPC .............. *G02B 27/64* (2013.01); *G02B 7/09* (2013.01); *G02B 27/646* (2013.01); *H04N 5/2257* (2013.01); *H04N 5/2258* (2013.01)

(58) Field of Classification Search
None
See application file for complete search history.

(56) References Cited

U.S. PATENT DOCUMENTS 9,448,382 B2    9/2016  Shabtay et al.
2007/0146883 A1 6/2007  Akada et al.
(Continued)

FOREIGN PATENT DOCUMENTS

JP    2003344889 A  * 12/2003
JP    2004311774 A  * 11/2004
(Continued)

OTHER PUBLICATIONS

Office Action is related KR patent application 10-2017-7032243, dated Mar. 2, 2018. 6 pages.
(Continued)

*Primary Examiner* — Derek S Chapel
(74) *Attorney, Agent, or Firm* — Nathan & Associates; Menachem Nathan

(57) ABSTRACT

Mechanisms for providing optical image stabilization in at least one direction as well as auto-focus in a digital camera comprise a plurality of springs mechanically coupled to at least a lens module carrying a lens of the digital camera, wherein the plurality of springs provides overall low stiffness to movement of the lens in two, first and second directions orthogonal to each other, and provides high stiffness to torsion of the lens module.

14 Claims, 6 Drawing Sheets

(56) References Cited

U.S. PATENT DOCUMENTS

| | | | |
|---|---|---|---|
| 2013/0201392 A1* | 8/2013 | Gutierrez | G03B 3/10 |
| | | | 348/374 |
| 2014/0009631 A1 | 1/2014 | Topliss | |
| 2014/0355120 A1 | 12/2014 | Yeo | |
| 2016/0230928 A1* | 8/2016 | Lewis | G03B 17/561 |
| 2017/0192195 A1* | 7/2017 | Murakami | G02B 7/04 |

FOREIGN PATENT DOCUMENTS

| | | | |
|---|---|---|---|
| KR | 20110094723 A * | 8/2011 | |
| WO | 2016/166730 A1 | 10/2016 | |

OTHER PUBLICATIONS

International Search Report and Written Opinion issued in related PCT patent application PCT/IB2016/53026, dated Oct. 13, 2016, 6 pages.

\* cited by examiner

BI-DIRECTIONAL STIFFNESS FOR OPTICAL IMAGE STABILIZATION IN A DUAL-APERTURE DIGITAL CAMERA

CROSS-REFERENCE TO RELATED APPLICATIONS

This application is a 371 application from international patent application PCT/IB2016/053026, and is related to and claims priority from U.S. Provisional Patent Application No. 62/167,571 filed on May 28, 2015 which is expressly incorporated herein by reference in its entirety.

FIELD

Embodiments disclosed herein relate in general to digital cameras and in particular to optical image stabilization (OIS) and auto-focus (AF) in single and/or dual-aperture ("dual-optical module") digital cameras.

BACKGROUND

In recent years, mobile devices such as cell-phones (and in particular smart-phones), tablets and laptops have become ubiquitous. Most of these devices include one or two compact cameras: a main rear-facing camera (i.e. a camera on the back side of the device, facing away from the user and often used for casual photography) and a secondary front-facing camera (i.e. a camera located on the front side of the device and often used for video conferencing).

Although relatively compact in nature, the design of most of these cameras is very similar to the traditional structure of a digital still camera, i.e. they comprise an optical component (or a train of several optical elements and a main aperture) placed on top of an image sensor. The optical component (also referred to as "optics") refracts the incoming light rays and bends them to create an image of a scene on the sensor. The dimensions of these cameras are largely determined by the size of the sensor and by the height of the optics. These are usually tied together through the focal length ("f") of the lens and its field of view (FOV)—a lens that has to image a certain FOV on a sensor of a certain size has a specific focal length. Keeping the FOV constant, the larger the sensor dimensions (e.g. in a X-Y plane) the larger the focal length and the optics height.

In addition to the optics and sensor, modern cameras usually further include mechanical motion (actuation) mechanism for two main purposes: focusing of the image on the sensor and optical image stabilization (OIS). For focusing, in more advanced cameras, the position of the lens module (or at least one lens element in the lens module) can be changed by means of an actuator and the focus distance can be changed in accordance with the captured object or scene. In these cameras it is possible to capture objects from a very short distance (e.g., 10 cm) to infinity. The trend in digital still cameras is to increase the zooming capabilities (e.g. to 5×, 10× or more) and, in cell-phone (and particularly smart-phone) cameras, to decrease the pixel size and increase the pixel count. These trends result in greater sensitivity to hand-shake or in a need for longer exposure time. An OIS mechanism is required to answer the needs in these trends.

In OIS-enabled cameras, the lens or camera module can change its lateral position or tilt angle in a fast manner to cancel the handshake during the image capture. Handshakes move the camera module in 6 degrees of freedom, namely linear movements in three degrees of freedom (X, Y & Z), pitch (tilt around the X axis), yaw (tilt around the Y axis) and roll (tilt around the Z axis). FIG. 1 shows an exemplary classical four rod-springs (102a-d) OIS structure in a single-aperture camera module 100. The four rod-springs are rigidly connected to an upper frame 104 that usually accommodates an AF actuator (not shown) that moves the lens module 106. This structure allows desired modes of movement in the X-Y plane (translation), FIG. 1a, but also allows a mode of unwanted rotation (also referred to as "θ-rotation" or "torsion") around the Z axis, FIG. 1b. The latter may be due to a combination of several causes such as asymmetric forces applied by the coils or by a user's (or phone) movements, imperfections of the rod-springs and the high rotational compliance of the four spring rod spring+frame structure.

In the case of a centered single-aperture camera module, this rotation does not affect the image quality severely, since the lens is axisymmetric. However, this does affect OIS in a dual-camera module, FIGS. 2a and 2b. FIG. 2a shows a rotation mode around an axis 202 roughly centered between two camera modules 204 and 206 of a dual-aperture camera 200. Because of the location of rotation axis 202, the rotation may cause significant deterioration in the image quality. The rotation causes each lens to shift away in undesired directions (shown by arrows in FIG. 2b), without having any ability to predict when and if this may happen. The result is motion blur of the image and a shift of the two lenses in opposite Y directions caused by the unwanted rotation that results in decenter between images received by each camera module, and therefore potentially in a catastrophic influence on fusion algorithm results.

Yet another problem may occur in a folded optics zoom dual-aperture camera, such as a camera 300 shown in FIG. 3. Such a camera is described for example in detail in co-owned international patent application PCT/IB2016/052179 which is incorporated herein by reference in its entirety. Camera 300 comprises a folded optics camera module 302 and an upright (non-folded) camera module 304. Among other components, folded optics camera module 302 comprises a lens actuation sub-assembly for moving a lens module 306 (and a lens therein, which is referred to henceforth as "folded lens") in the X-Y plane. The lens actuation sub-assembly includes a hanging structure with four flexible hanging members (i.e. the "rod-springs" referred to above) 308a-d that hang lens module 306 over a base 310. In some embodiments, hanging members 306a-d may be in the form of four wires and may be referred to as "wire springs" or "poles". The hanging structure allows in-plane motion as known in the art and described exemplarily in co-owned U.S. patent application Ser. No. 14/373,490. Exemplarily, a first movement direction 312 of the lens is used to achieve Auto-Focus (AF) and a second movement direction 314 is used to achieve OIS. A third movement, an unwanted rotation 316 of the lens about an axis parallel to the Z axis as described above actually causes an unwanted effect of dynamic tilt of the lens (the lens' optical axis may not be perpendicular to the sensor's surface due to that rotation) and may result in images that are usually sharp on one side and blurry on the other side.

The physical quantities that reflect the tendency of any structure to dynamically behave one way or another are the natural frequency values that characterize each mode of behavior. This is of course also relevant for the hanging structure described above. FIGS. 4(a)-(c) show the simulated behavior of a standard rigid plate supported by four round rod-spring poles. The rigid plate may represent any optical element (such as, for example, a lens). The rod-spring poles have the same rigidity to movement in any direction in the X-Y plane (which is perpendicular to the pole's neutral axis). The figures show the compliance of the structure expressed in terms of a natural frequency ratio for each different movement mode: FIG. 4a refers to X-translation, FIG. 4b refers to Y-translation and FIG. 4c refers to rotation around the Z axis. The arrows show schematically the different movements. The reference bar indicates deformation scale in millimeters. The normalized (relative to the first frequency which in this exemplary case is of 33.6 Hz) natural frequencies for X and Y translations are of the same order (specifically 1 in (a) and 1.1 in (b)), whilst the natural frequency for rotation (c) has a relative value of 1.8, which is also of the same order of the X and Y translations. Thus the ratio between natural frequencies for torsion (rotation around Z) and for X or Y translation is about 1.8. In general, known ratios are no larger than 2. This means that the chance that the torsion mode will arise is almost the same as the chance that the X and Y translation modes will arise. This may cause problems in dual-aperture and/or folded zoom cameras (where it will be expressed as dynamic tilt) as described above.

In view of the above, it would be very difficult to get the desired movement of the lens without an active control loop (having such a control loop is one possible way to overcome the described problems). The unwanted torsion may be reduced significantly by means of electrical control over the force applied by the coils (i.e. by using several coils and controlling them so the resultant torque acts to limit the rotation of the lens within specified acceptable limits). However, the addition of an active control loop to avoid tilt complicates the design and adds to cost. It would be therefore advantageous to have lens actuation sub-assemblies for OIS without an active control loop for rotation/tilt.

SUMMARY

In an exemplary embodiment, there is provided a mechanism for providing optical image stabilization (OIS) in at least one direction in a digital camera, comprising: a plurality of springs mechanically coupled to at least a lens module carrying a lens of the digital camera, wherein the plurality of springs provides overall low stiffness to movement of the lens module in two, first and second directions orthogonal to each other and high stiffness to torsion of the lens module such that a ratio between natural frequencies arising from the high stiffness and the low stiffness is greater than 2.

In an exemplary embodiment, the plurality of springs includes a first plurality of springs with low stiffness in the first direction and high stiffness in the second direction; and a second plurality of springs with high stiffness in the first direction and low stiffness in the second direction.

In an exemplary embodiment, the ratio between natural frequencies arising from the high stiffness and the low stiffness is greater than 3.

In an exemplary embodiment, the ratio between natural frequencies arising from the high stiffness and the low stiffness is greater than 5.

In an exemplary embodiment, the ratio between natural frequencies arising from the high stiffness and the low stiffness is greater than 10.

In an exemplary embodiment, the mechanism is dimensioned to accommodate the lens module without obstructing an optical path passing through the lens.

In an exemplary embodiment, the first plurality includes two pairs of leaf springs and the second plurality includes a pair of cross springs.

In an exemplary embodiment, the first plurality includes a pair of leaf springs and one cross spring and the second plurality includes a pair of cross springs.

In an exemplary embodiment, each of the first and second pluralities includes a pair of cross springs.

In an exemplary embodiment, the digital camera is a dual-optical module camera.

In an exemplary embodiment, the lens is a folded lens.

In an exemplary embodiment, the camera is adapted to perform auto-focus.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated like numerals.

DETAILED DESCRIPTION

We have determined that lens support structures used for AF and OIS may be designed with support members that have different compliance (stiffness) to movements in different directions of different types of movements. The different compliance in different movement directions or for different movement types may be obtained by non-round or non-square supports cross sections of such support members.

Figure 5:
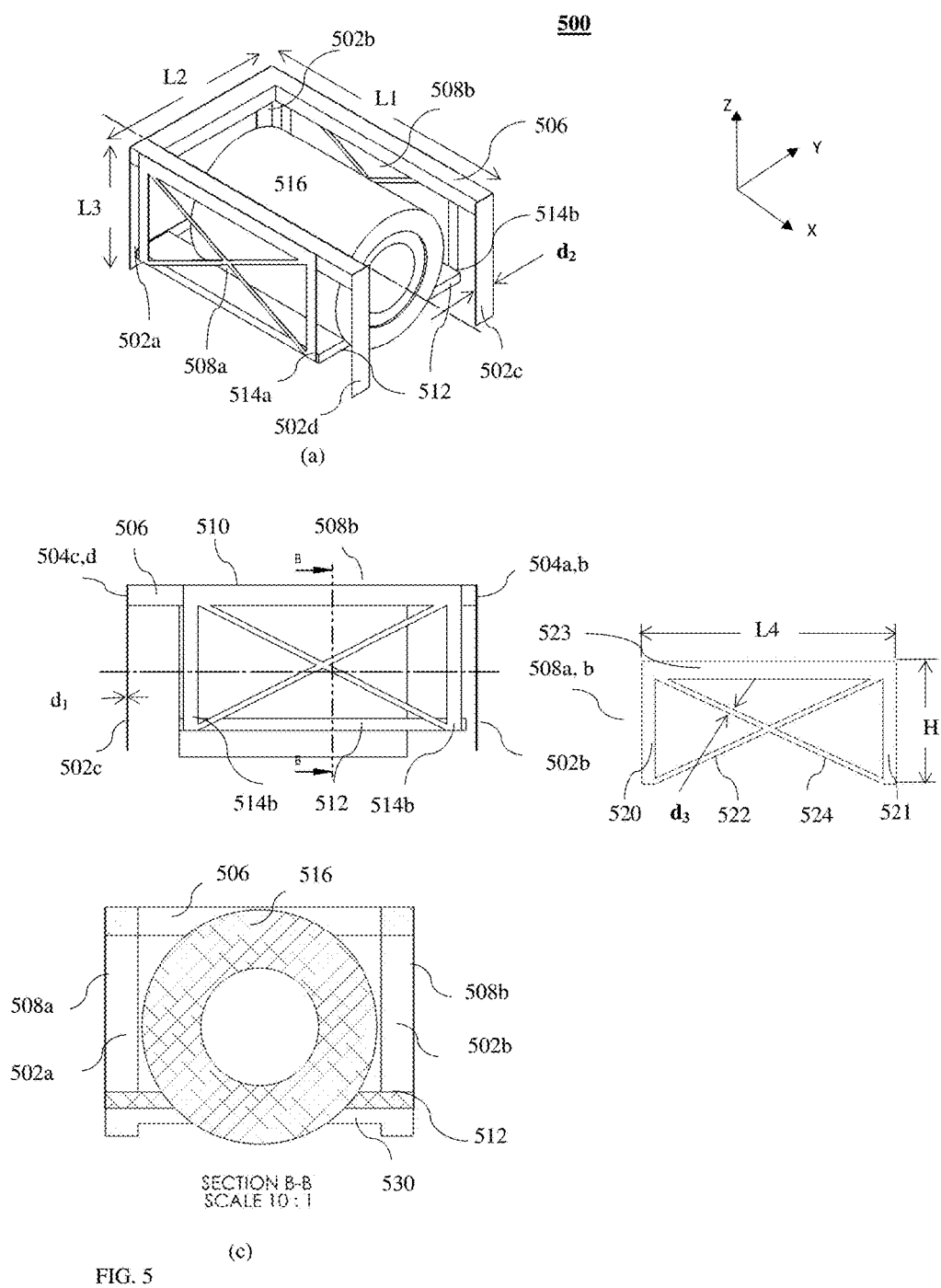
FIG. 5 shows an exemplary embodiment of an OIS and AF support structure disclosed herein in a folded optics camera module in (a) an isometric view, (b) side view and (c) radial cross section.

FIG. 5 shows an exemplary embodiment of a folded lens 500 held by a support structure numbered 502 in (a) an isometric view, (b) side view and (c) radial cross section. Exemplarily, support structure 502 may comprise four support spring members 502a-d, each spring member being essentially a thin leaf spring with high stiffness in one direction (e.g. Y) and low stiffness in a second direction (e.g. X) perpendicular to the first direction. In this description, the term "high stiffness" used with reference to a spring structure refers to a spring structure having a natural frequency in the range of hundreds to thousands of Hertz, exemplarily between 200-4000 Hz. The term "low stiffness" used with reference to a spring structure refers to a spring structure having a natural frequency in the range of tens of Hertz, exemplarily between 30-100 Hz. In general, the natural frequency of a spring is proportional to the square root of its stiffness.

Henceforth, support members 502 are referred to as "leaf springs". Exemplarily, a leaf spring 502 has a length L3 of 4.8-5.5 mm and a rectangular cross section, with a small (exemplarily 20-60 μm) thickness $d_1$ in the flexing direction (here X) and with a significantly larger (exemplarily 0.5-1 mm) width $d_2$ in the non-flexing direction (here Y). The structure and mechanical properties of the leaf springs allows only movement for AF in the X direction. Each leaf spring is rigidly connected at a respective upper end 504a-d to a rigid upper frame 506 and at a respective bottom end to a base such as base 310. Leaf springs 502a and 502b may optionally be connected at a bottom end by a bar 530. Support structure 502 further comprises two support springs 508a and 508b coupled rigidly to frame 506 at an upper end 510 and to a lens support plate 512 at a lower end (respectively 514a and 514b). Support springs 508a and 508b are designed to have low stiffness in the Y direction for OIS movement, and high stiffness in the X direction, while not adding significantly to the camera module width. Exemplarily and as shown separately, springs 508a or 508b include two leaf spring members 520 and 521 connected by two diagonal leaf spring members 522 and 524. The leaf springs and diagonal springs are connected at an upper end to a member 523. Hereinafter, a support spring such as a spring 508 is referred to as "cross spring". Exemplarily, a diagonal leaf spring member has a rectangular cross section with a thickness of the same order of that of a leaf spring 502 (exemplarily 20-60 μm) and a width $d_3$ of about 0.2 mm. Exemplarily, a cross spring 508 may have a length dimension L4 in the range of 7-10 mm and a height H in the range of 4-5 mm. Exemplarily in an embodiment, L4 is approximately 9.5 mm and H is approximately 4.6 mm. Optionally or alternatively, leaf springs 502a and 502b may be replaced by a cross spring 508, with care being taken (if necessary) not to obstruct an optical path. In yet another alternative embodiment, a cross spring 508 may also replace leaf springs 502c and 502d, with care being taken (if necessary) not to obstruct an optical path.

Frame 506 may exemplarily be made of a plastic material such as LCP (VECTRA® E525T). Plate 512 is rigidly connected to a lens 516 (or to a lens carrier carrying the lens). In this embodiment, upper frame 506 has a U-shape so as not to block an optical path to a path-folding optical element (e.g. mirror or prism, not shown). Exemplarily, frame 506 has dimensions of $L_1$=11.9 mm and $L_2$=7.6 mm. More generally, the ratio $L_2/L_1$ can be between 0.5-0.7.

Figure 1:
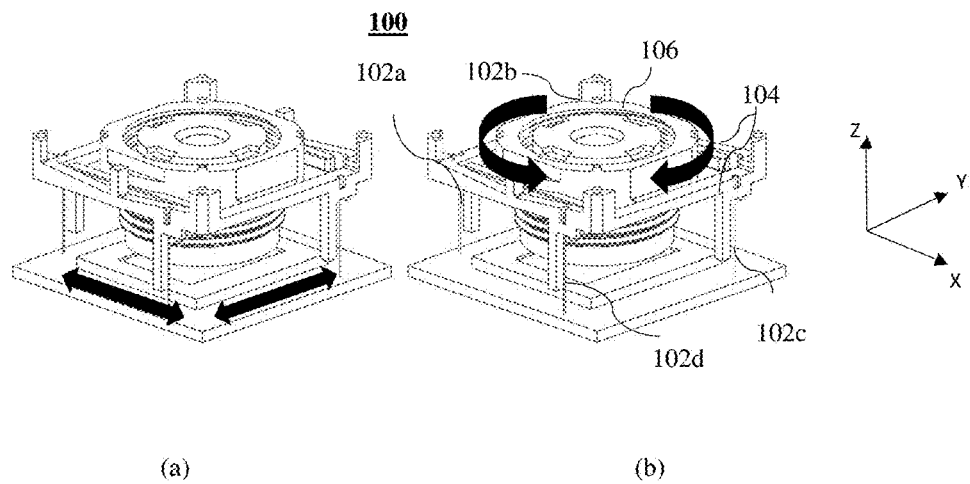
FIG. 1 shows a camera module with an exemplary classical four rod-springs OIS structure: (a) modes of wanted X-Y translations, and (b) mode of unwanted rotation around the Z axis.
Figure 2:
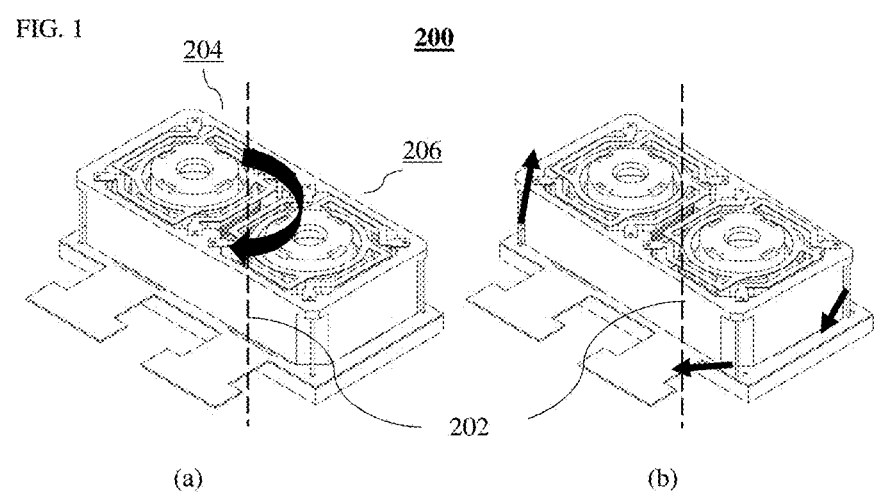
FIG. 2 shows a dual-aperture camera: (a) rotation mode around an axis roughly centered between two camera modules, and (b) movement of each lens in undesired directions.
Figure 3:
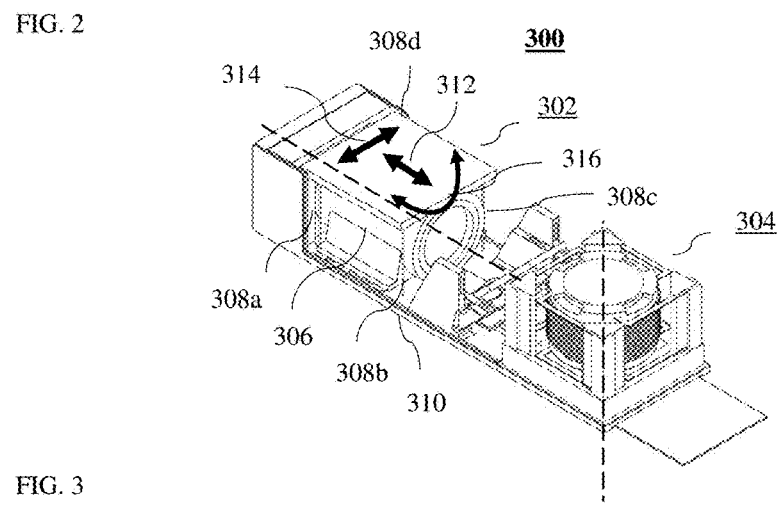
FIG. 3 shows a dual-camera module with a folded optics camera module.
Figure 4:
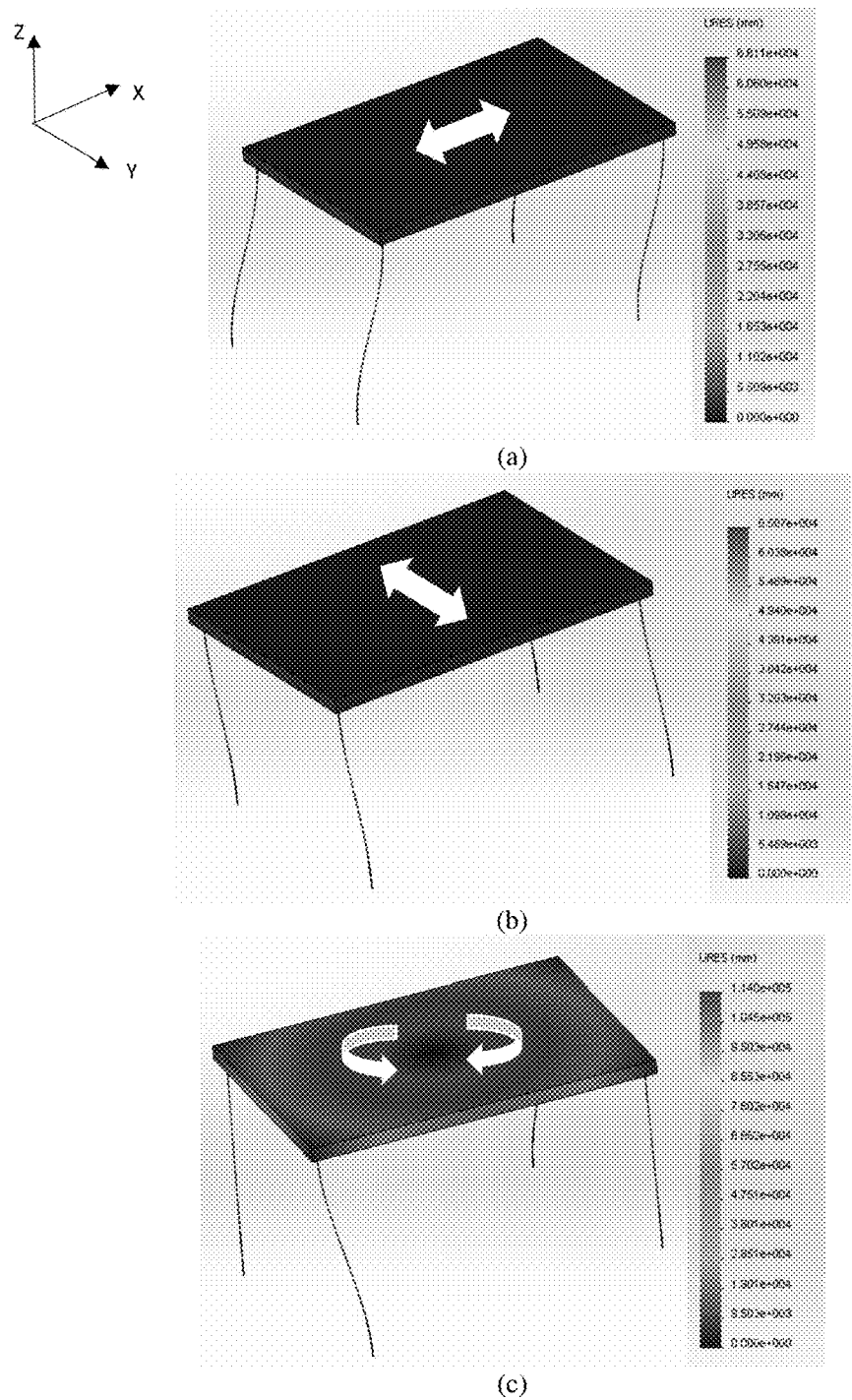
FIG. 4 show the simulated behavior of a standard rigid plate supported by four round rod-spring poles: (a) movement in the X-direction, (b) movement in the Y direction and (c) tilt around a rotation axis.
Figure 6:
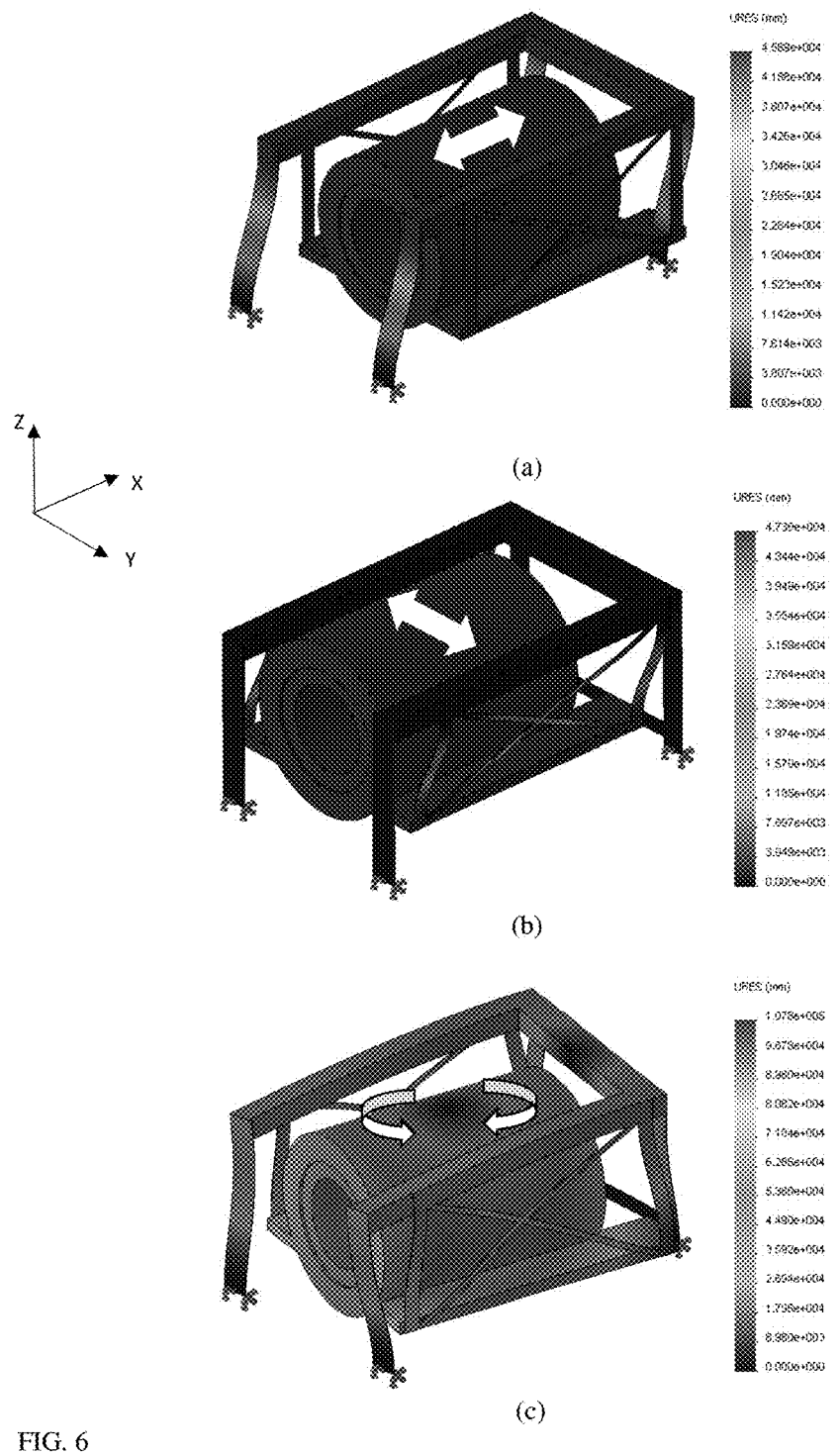
FIG. 6 shows the simulated behavior of the support structure of FIG. 5 for (a) movement in the X-direction, (b) movement in the Y direction and (c) tilt around a rotation axis.

FIG. 6 shows the first three modes of the support structure of FIG. 5 resulting from modal Finite Element Analysis where: (a) describes a mode of movement in the X-direction for AF, (b) describes a mode of movement in the Y direction for OIS and (c) describes a mode of (unwanted) tilt around a rotation axis like movement 316 thin FIG. 3. The arrows show schematically the different movements. In use for AF, the lens and upper frame 506 is actuated to move in the X direction while flexing springs 502. Movement in the Y direction and unwanted rotation such a rotation 316 around the Z-axis in FIG. 3 are minimal. For OIS, lens movement in the Y direction is allowed by the flexing of cross springs 508 (see also FIG. 6b), while movement in the X direction and unwanted rotation around the Z-axis are again minimal. Specifically, the normalized (relative to a first frequency which in this exemplary case is of 40 Hz) natural frequencies for X and Y translations are of the same order (specifically 1 in (a) and 1.2 in (b)), whilst the natural frequency for rotation (c) has a relative value of 29.3. That is, the natural frequency in FIG. 6c is of a significantly higher order than that in FIGS. 6a and 6b. Advantageously, the arrangement of separate leaf springs (flexible in the X-direction) and cross springs (flexible in the Y direction) prevents unwanted rotation motion around the Z-axis.

In an embodiment and exemplarily, the springs are made of a copper-nickel-tin mx-215 alloy with an elastic modulus of 125 GPa. In other exemplary embodiments, the springs may be made of some other metal alloy or of a non-metal, for example of polymer or plastic material, a composite material or a combination of metal/ceramic and/or plastic materials, chosen such that the dimensions and elastic properties fit the camera form requirements.

Figure 7:
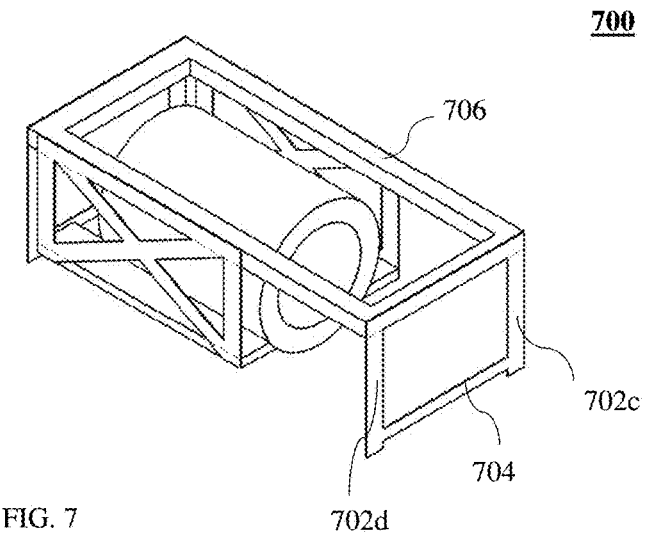
FIG. 7 shows an isometric view of another exemplary embodiment of an OIS and AF support structure in a folded optics camera module.

FIG. 7 shows an isometric view of another exemplary embodiment of a support structure in a folded optics camera 700. Here, an upper frame 706 is closed and leaf springs 702c and 702d are connected at the bottom by a bar 704, imparting added stiffness in the Y direction. Alternatively, the leaf springs and bar may be replaced by a cross spring. The frame is closed behind the optical path folding element (prism or mirror) so there is no problem of disturbing the optical path to this element. In yet another embodiment shown in FIG. 9, an upper frame 906 has a closed rectangular shape strengthened by two cross bar members 906a and 906b.

Figure 8:
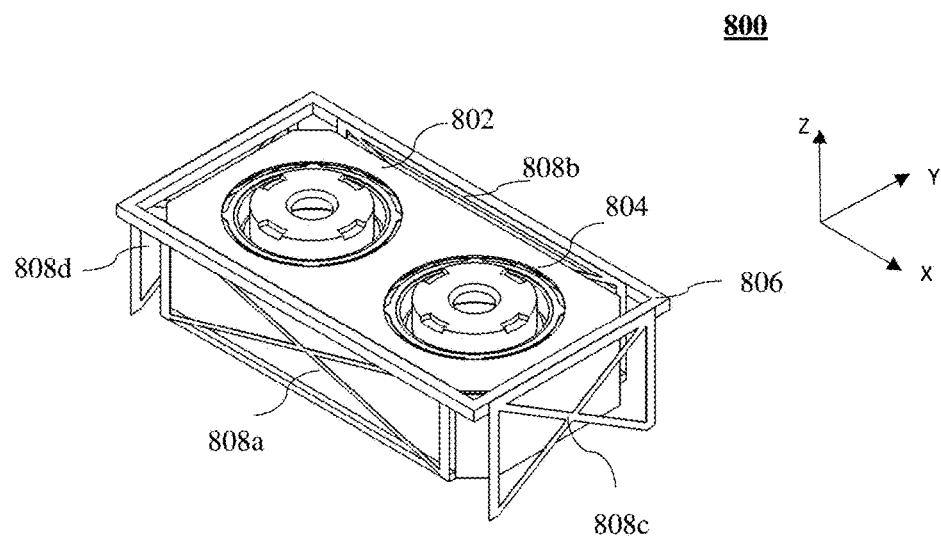
FIG. 8 shows an isometric view of an exemplary embodiment of a dual-aperture camera with two camera modules held by a support structure disclosed herein.

FIG. 8 shows an isometric view of an exemplary embodiment of a dual-aperture camera 800 with two camera modules 802 and 7804 held by a support structure disclosed herein. An upper frame 806 is closed like frame 706 in FIG. 7, while the support structure is comprised of cross springs 808a-d. Here, the support structure is designed for OIS in two directions—X and Y.

Figure 9:
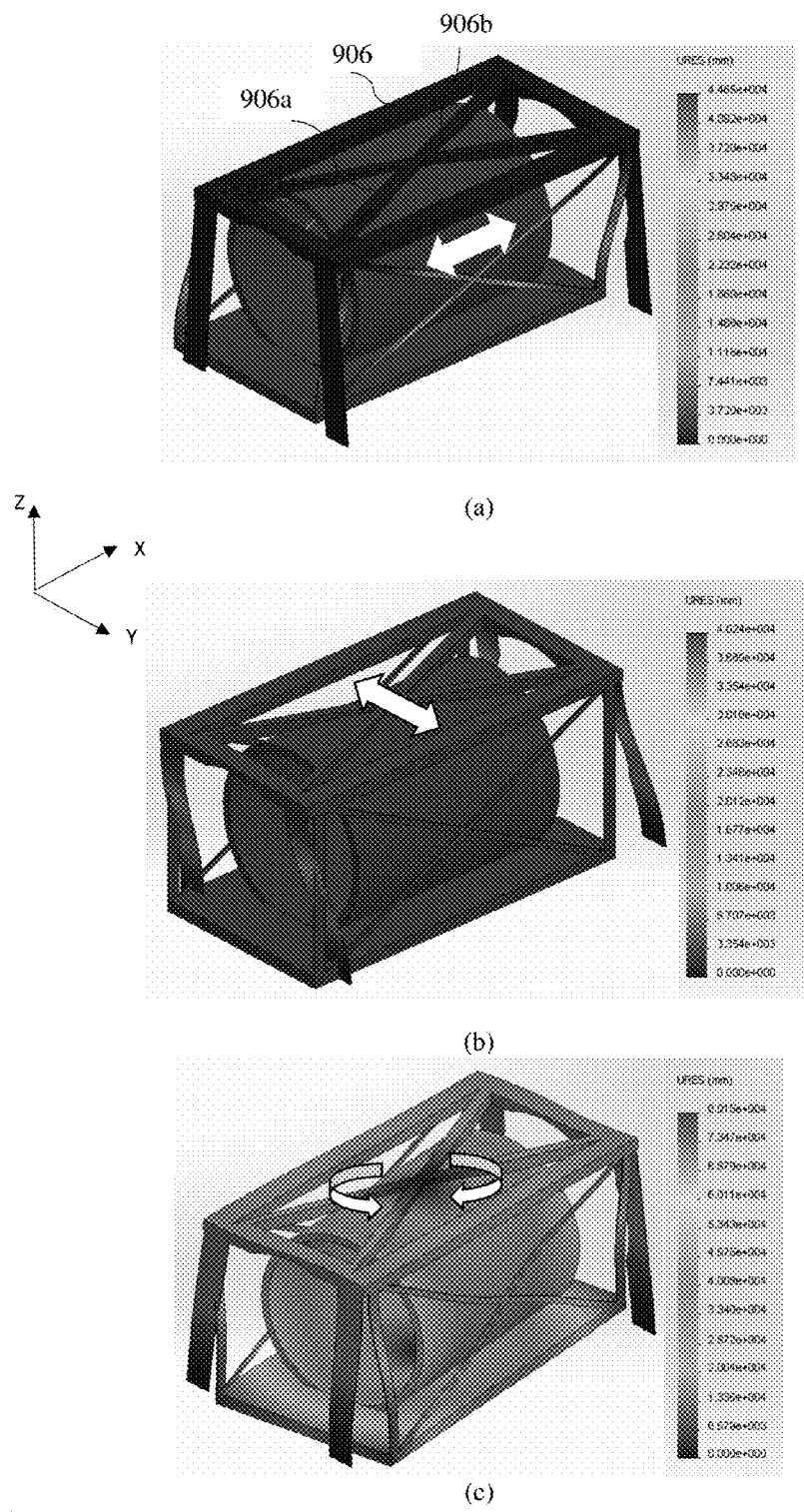
FIG. 9 shows the simulated behavior of another exemplary embodiment of a support structure in a folded optics camera module for (a) movement in the X-direction, (b) movement in the Y direction and (c) tilt around a rotation axis.

FIG. 9 shows the first three modes of another exemplary embodiment of a support structure in a folded optics camera module, as resulting from modal simulation, where: (a) describes a mode of movement in the X-direction for AF, (b) describes a mode of movement in the Y direction for OIS and (c) describes a mode of (unwanted) tilt around a rotation axis. The arrows show schematically the different movements. The first frequency is 100 Hz, and the normalized natural frequencies for X and Y translations are of the same order (specifically 1 in (a) and 1.2 in (b)), whilst the natural frequency for torsion (c) has a relative value of 23.9.

In summary, the performance of the support structures provided herein in terms of avoidance of unwanted linear movement and rotation (torsion) while performing AF and OIS is much superior to that of any known support structure used for the same purposes.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A mechanism for providing optical image stabilization (OIS) in at least one direction in a digital camera, comprising: a plurality of springs mechanically coupled to at least a lens module carrying a lens of the digital camera, wherein the plurality of springs provides overall low stiffness to movement of the lens module in two, first and second directions orthogonal to each other and high stiffness to torsion of the lens module such that a ratio between natural frequencies arising from the high stiffness and the low stiffness is greater than 2.

2. The mechanism of claim 1, wherein the plurality of springs includes a first plurality of springs with low stiffness in the first direction and high stiffness in the second direction; and a second plurality of springs with high stiffness in the first direction and low stiffness in the second direction.

3. The mechanism of claim 2, wherein the first plurality of springs includes two pairs of leaf springs and wherein the second plurality of springs includes a pair of cross springs.

4. The mechanism of claim 2, wherein the first plurality of springs includes a pair of leaf springs and one cross spring and wherein the second plurality of springs includes a pair of cross springs.

5. The mechanism of claim 2, wherein each of the first and second pluralities of springs includes a pair of cross springs.

6. The mechanism of claim 1, wherein the ratio between natural frequencies arising from the high stiffness and the low stiffness is greater than 3.

7. The mechanism of claim 1, wherein the ratio between natural frequencies arising from the high stiffness and the low stiffness is greater than 5.

8. The mechanism of claim 1, wherein the ratio between natural frequencies arising from the high stiffness and the low stiffness is greater than 10.

9. The mechanism of claim 1, wherein the mechanism is dimensioned to accommodate the lens module without obstructing an optical path passing through the lens.

10. The mechanism of claim 1, wherein the plurality of springs includes a pair of cross springs.

11. The mechanism of claim 1, wherein the plurality of springs includes a mix of leaf springs and cross springs.

12. The mechanism of claim 1, wherein the digital camera is a dual-optical module camera.

13. The mechanism of claim 1, wherein the lens module is a folded lens module.

14. The mechanism of claim 1, adapted to perform auto-focus.

* * * * *